Dec. 14, 1937.  S. G. LANGLEY  2,102,423
PHONOGRAPH
Filed Sept. 14, 1934
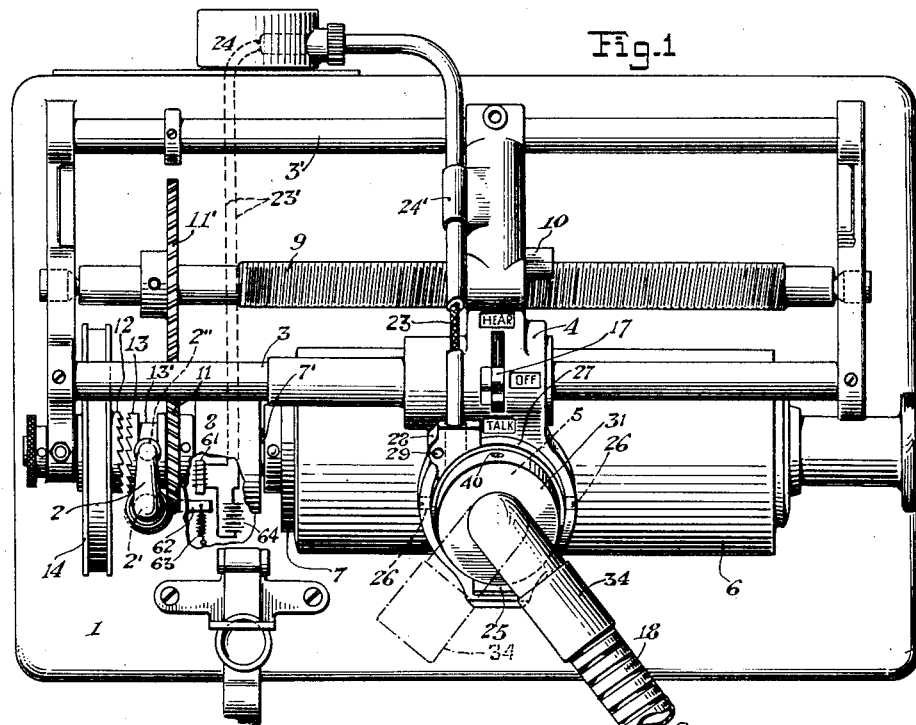
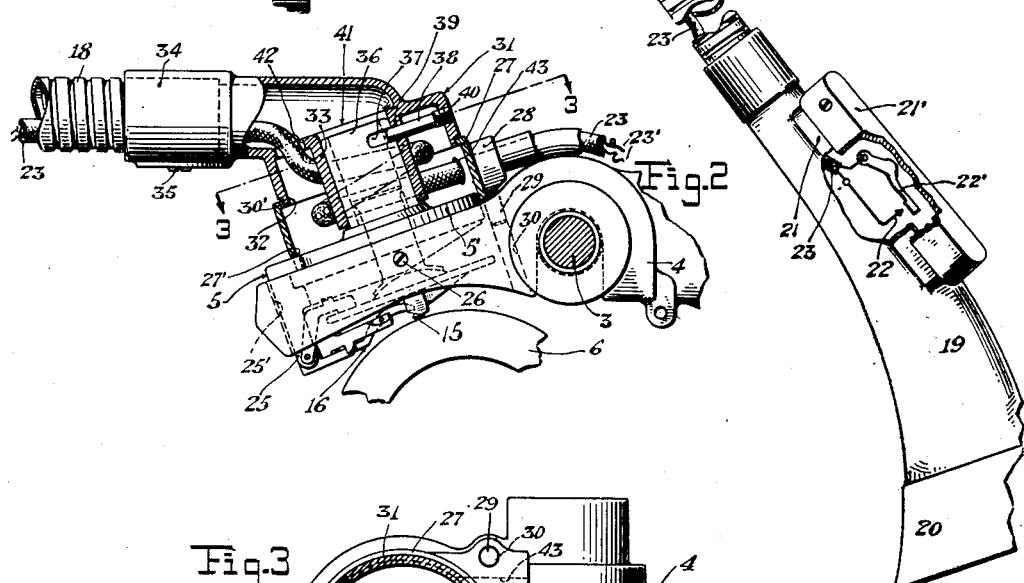
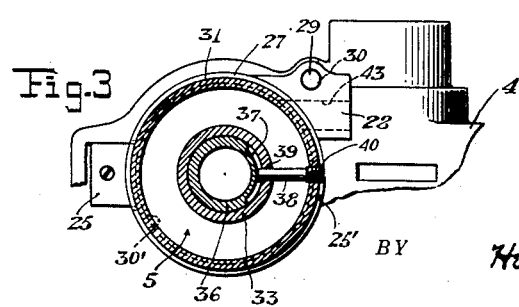
INVENTOR
SAM G. LANGLEY
BY Henry Lanahan
ATTORNEY Patented Dec. 14, 1937

2,102,423

UNITED STATES PATENT OFFICE 2,102,423

PHONOGRAPH

Sam G. Langley, Maplewood, N. J., assignor to Thomas A. Edison, Incorporated, West Orange, N. J., a corporation of New Jersey Application September 14, 1934, Serial No. 743,949

15 Claims. (Cl. 274—17)

This invention relates to phonographs and more particularly to those of the type primarily adapted and principally used for the recordation and reproduction of dictation.

In such instruments a record adapted to receive and to bear and/or bearing an impression of sound waves is rotated, and there are meanwhile moved transversely of the direction of record rotation suitable sound translating means engaging the record surface and adapted to produce therein impressions in accordance with sound (particularly dictation) to be recorded and/or to produce sound vibrations in accordance with impressions existing in the record surface. A sound transmitting tube links the translating means with a mouth-piece, alternatively usable as an ear-piece, adapted to be grasped in the hand of the dictator. It is also common in such instruments to provide electric, pneumatic or mechanical means controlling the rotation of the record, these means being connected by wiring, tubing or other elongated flexible device extending from the main portion of the instrument along or within the sound transmitting tube, to a suitable device (in the case of electric controlling means, a switch) conveniently located within or near the region of normal grasp of the tube by the dictator.

It is an object of my invention to provide, in an instrument of the class described, improved means for coupling the sound transmitting tube to the translating means.

It is a further object to provide an improved coupling means whereby there are reduced strains on either or both the tube and the translating means with their associated parts, resulting either from manipulation of the tube by the dictator or from the above mentioned motion of the translating means.

It is a still further object to provide improved coupling means wherethrough the wiring, tubing or other flexible connecting device above mentioned, is passed without danger of damage thereto as a result of such manipulation or such motion.

A more specific object is the provision of an improved swivelling coupling between the tube and translating means wherethrough the wiring or other flexible connecting means is passed without danger of damage thereto.

A further specific object of the invention is the provision of an improved swivelling coupling readily detachable, with the tube, from the main portion of the instrument.

Other and allied objects will more fully appear from the following description and the appended claims.

In the description of my invention hereinafter set forth reference is had to the accompanying drawing, in which:

Figure 1 is a plan view of a phonograph to which one form of my invention has been applied, a small portion of the base therein being broken away for the better schematic illustration of an internal portion;

Figure 2 is a right hand end view, partly in elevation and partly in section, showing in detail the improved swivelling coupling incorporated in the instrument of Figure 1; and Figure 3 is a cross-sectional view taken along the line 3—3 of, and aiding in the reading of, Figure 2.

Reference being directed to Figure 1, there will be seen a frame or base 1 which supports the principal parts of the instrument, and which will be understood ordinarily to be mounted on the top of a suitable cabinet not herein necessary to be shown. The illustrated instrument is intended for use with a cylindrical record which is shown as 6 and is removably carried by mandrel 7. The shaft 7' of the mandrel is journalled in a standard 8, which is secured to or integral with base 1. Longitudinal rods 3 and 3' are supported above the base by suitable standards and thereon is adapted to slide carriage 4 bearing a sound box 5. The sound box comprises the translating means in the illustrated instrument, and contains elements respectively arranged to engage the surface of the record 6 during recordation and reproduction, being hereinafter further referred to. A control lever 17 adjusts the instrument, including the elements of the sound box 5, to either recording, reproducing or neutral conditions. Longitudinal movement of the carriage 4 along the rods 3 and 3', coincident with rotation of the mandrel 7 during either reproduction or recordation, is produced by a feed screw 9 which is engaged by feed nut 10 borne by the carriage and is driven from the mandrel shaft 7' by virtue of the engagement of a shaft-borne gear 11 and a screw-borne gear 11'.

The immediate source of rotative power for the mandrel shaft 7' (and hence for the screw 9) is a pulley 14, which is itself rotated by means not herein necessary to be shown. In order to provide instantaneous control over the rotation of the mandrel it is customary to provide a clutch engaging and disengaging the shaft 7' with and from the pulley at will. Such a clutch is illustrated in Figure 1 as comprising member 12 secured to the pulley 14; and a member 13 splined to shaft 7', capable of slight movement longitudinally of the shaft, and provided with an annular groove 13'. The clutch, through the medium of suitable mechanical means such as a horizontal arm 2 having a vertical portion 2' swivellingly mounted in base 1 and having an extremity 2'' engaging the groove 13', is selectively controlled to be engaged and disengaged at will; and my invention contemplates the employment of either electric, pneumatic or mechanical means for effecting this selective control. However the specific control means shown herein for the purpose of illustrating my invention, is electrical. I have already described, in my U. S. Patent No. 1,380,486, a suitable and preferred type of such electrical control means; but as a simple embodiment of electrical control means sufficient for the illustration of the present invention, I have schematically shown an electromagnet 61 energizable as from a battery or other current source 64 and arranged upon energization to attract a horizontal armature 62 secured to vertical arm portion 2' beneath base 1. In this particular simple embodiment energization of the electromagnet 61 will cause the swinging of armature 62 and hence of the arm 2 in a counter-clockwise direction and hence the engagement of the clutch, which may be maintained disengaged at other times as by a tension spring 63, tending to impart a clockwise swinging movement to armature 62 and hence to arm 2. Thus this simple embodiment of electric control means functions to produce mandrel rotation only when the electromagnet 61 is energized. It is definitely to be understood, however, that I not only contemplate no limitation of my invention either to the employment of the particular electric control means illustrated or indeed to the employment of control means which are electrical.

During recordation of dictation sound vibrations are collected from the neighborhood of the dictator's mouth and transmitted to the sound box 5 by a mouth-piece 20 and flexible tube 18. Upon arrival at the sound box the vibrations actuate the recording stylus 15, which forms an element of the sound box and appears only in Figure 2. This stylus, then being in engagement with the record surface and the record being rotated, produces a record groove in that surface varying in depth in accordance with those sound vibrations. For such reproduction of the recorded dictation as the dictator may from time to time desire, the reproducing stylus 16, also forming an element of the sound box and appearing only in Figure 2, is engaged with the record surface and the record rotated; then this stylus, with the aid of other elements of the sound box not herein necessary to describe, produces sound vibrations corresponding to the groove existing in the record surface. These vibrations are transmitted outwardly through the tube 18 to the mouth-piece 20, which may then be used as an ear-piece. The assembly of tube and mouth-piece is provided with a handle portion 19 adapted to be held in the hand of the dictator; and in order to afford the greatest convenience in the control of mandrel rotation, the above described electric control means therefor are made to include as their governing element a suitable switch carried by the handle portion 19. Such a switch has been illustrated in Figure 1 as comprising a base portion 21 secured to the handle portion 19; a relatively movable portion 21'; a spring or other means (not shown) for normally biasing the portion 21' to an outward position wherein it partially encloses the portion 21 and from which it is movable inwardly to a position wherein it more completely encloses portion 21; and switch contacts 22 and 22' respectively carried by portions 21 and 21'. It will be understood that the switch is normally open, but that when portion 21' is pressed inwardly the contacts 22 and 22' are connected and the switch is closed. Electrical leads 23' connect the switch contacts to the electromagnet 61, the battery or other source 64 being connected in one of the leads. To permit the convenient detachment of the portion of leads 23' not disposed beneath base 1 from the portion so disposed, there is provided a separable plug 24. From this plug to the switch the leads 23' are disposed within a cable 23 passing over rods 3 and 3', through the swivelling coupling hereinafter described, and interiorly of the tube 18 to the switch.

The swivelling coupling of the flexible tube to the sound box which is the principal feature of my invention, is best shown in Figs. 2 and 3. Referring to these figures, the sound box 5, which is substantially circular in cross-section, carries the styli 15 and 16, already mentioned, and is provided with a lug portion 25 extending downwardly from the main portion thereof. The sound box is retained, as by set screws 26, in a suitable recess 25' provided in the forward part of carriage 4, but projects slightly above the carriage as shown at 5', the projecting portion being circular in cross-section except for the said lug portion 25. Extending upwardly from the top of the sound box at the center thereof is a tubular portion 36, which forms a passage for sound to and from other portions of the sound box. It is to the sound box portions described in this paragraph that my swivelling coupling is connected, to which in turn is secured the tube 18.

According to my invention the cable 23 passes through the coupling in such manner that the cable portion lying between the coupling and the plug 24 will be uninfluenced by the swinging movement of the tube 18, and of the therein contained cable portion. The coupling itself may be considered as comprising two parts: a first part which is at all times stationary and into which the cable passes from plug 24, and a second part which is swivellingly movable within limits and to which is secured the tube 18. The coupling is so arranaged that the two parts, after being merely set in place, may be mechanically secured to the sound box by means of a single screw.

The first part of the coupling is a cylindrically shaped member or ring 27 adapted to fit about the projecting portion 5' of the sound box, and is suitably cut away at 27' to clear the lug 25. It is provided with an outwardly extending boss 28, and extending downwardly from this boss is a pin 29 adapted to engage a hole 30 provided in the carriage 4. It will be appreciated that when the ring 27 is placed over the projecting portion 5' and the pin 29 engaged in the hole 30, the ring is secured against all excepting upward movement. Beginning at plug 24, the cable 23 extends through a holding clip 24' on the rear portion of the carriage 4 and passes into the ring 27 through an aperture 43 in the boss 28.

The second part of the coupling comprises an inverted cup member 31 having a central interior tubular portion 33, and having an exterior tubular portion 34 which extends angularly away from the top 41 of the member 31 and forms a continuous passage with the interior tubular portion 33. Secured to the outer extremity of the tubular portion 34, as by set screw 35, is the tube 18. The interior tubular portion 33 is adapted to fit over the tubular portion 36 of the sound box 5. Thus the passage for sound to and from other portions of the sound box provided by the tubular portion 36 is extended to the mouthpiece extremity of tube 18. The fitting of the interior tubular portion 33 over the portion 36 is relied on as a bearing for the swivelling of cup member 31. The bottom edge portion of member 31 is shouldered at 32, the reduced portion thus formed fitting fairly closely within an annular flange 30' of ring 27. With this arrangement a single pin retaining the second part of the coupling means in proper mechanical relation to the sound box may also be relied upon to maintain the first part in such relation. This pin is shown as a screw 40, which is threaded through the outside wall of the cup member 31. Its inner portion 38 is of reduced diameter and unthreaded, passes through an aperture 39 in the interior tubular portion 33, and engages a segmental groove 37 in the tubular portion 36 of the sound box. Impingement of the portion 38 of the screw upon the extremities of the groove 37 appropriately limits the arc through which the second, or movable, part of the coupling swivels, the extreme positions of the exterior tubular portion 34 being respectively shown in full and dotted lines in Figure 1.

The cable 23, is passed in a counter-clockwise direction, as illustrated, around the interior tubular portion 33 slightly more than one full turn; and is then led upwardly through an aperture 42 in the top 41 of the cup member 31 into the exterior tubular portion 34 and thence through the tube 18 to the switch. With the movable part of the coupling means in its extreme counter-clockwise position the cable may be adjusted to pass around the interior tubular portion 33 with negligible slack; then the only effect on the cable of swivelling of the movable part of the coupling means to the opposite extreme is that of slightly increasing the cable slack around the interior tubular portion 33.

It will be readily understood that with my improved coupling, movements either of the sound box 5 or of the tube 18 which would otherwise impose a strain upon the other of those two elemeans will simply produce a swivelling of the second part of the coupling means with relation to the first, and hence of the tube with relation to the sound box. It will further be understood that the function of the coupling of providing a passage for sound between these elements is in no way impaired by the swivelling action, and that this action involves no danger of damage to the electric wires or other flexible connecting means of the control device employed, passing through the coupling.

I claim:—

1. Phonographic apparatus comprising a sound conducting tubular member, a control device carried by said tubular member and operable to control a part of the phonographic apparatus, sound translating means, means connecting said tubular member and translating means for relative swivelling movement and providing an enclosed sound passageway therebetween, and a flexible control connection extending from said control device and having spaced portions adjacent said passageway which are respectively associated with said tubular member and translating means to partake of substantially all movements thereof respectively and having a slack portion connecting said spaced portions and loosely encircling said passageway.

2. Phonographic apparatus comprising a sound conducting tubular member, a control device carried by said tubular member and operable to control a part of the phonographic apparatus, sound translating means, means connecting said tubular member and sound translating means for relative swivelling movement and providing a sound duct therebetween and an enclosure about said duct, and a flexible control connection extending from said control device and having spaced portions at points adjacent said enclosure which are respectively associated with said tubular member and translating means to partake of substantially all movements thereof respectively and having a slack portion connecting said spaced portions and disposed within said enclosure.

3. The combination with a phonograph including a record rotating device, sound translating means movable to engage various surface portions of a record rotated by said device, a sound transmitting tube, and a manually operable device carried by said tube for controlling the operation of said rotating device; of swivelling means coupling said tube to said translating means, portions of said coupling means forming with said translating means an annular enclosure; and flexible means connected to said manually operable device, said flexible means extending from said manually operable device longitudinally of said tube into said enclosure, circling within said enclosure, and passing outwardly from said enclosure in fixed relation to said translating means.

4. The combination with a phonograph including a record rotating device, sound translating means movable to engage various surface portions of a record rotated by said device, a sound transmitting tube, and a manually operable device carried by said tube for controlling the operation of said rotating device; of means coupling said tube to said translating means and comprising a part in fixed relation to said translating means and a relatively swivellable part; an interior tubular element comprised in said swivellable part and forming with said fixed part an annular recess; and flexible means connected with said manually operable device and extending from the latter longitudinally of said tube and into said recess, therein encircling said tubular element, and passing from said recess outwardly through said fixed part of said coupling means.

5. The combination with a phonograph including a record rotating device, sound translating means movable to engage various surface portions of a record rotated by said device, a sound transmitting tube, an electric circuit for controlling the operation of said rotating device, and a switch carried by said tube and adapted to be connected into and to govern said circuit; of means connecting said tube to said translating means for relative swivelling movement and providing a sound duct therebetween and an enclosure about said duct; and electric leads connecting said switch into said circuit, said leads passing from said switch longitudinally of said tube into said enclosure, having a slack portion disposed in said enclosure, and passing outwardly from said enclosure in fixed relation to said translating means.

6. The combination with a phonograph including a record rotating device, sound translating means movable to engage various surface portions of a record rotated by said device, a sound transmitting tube, an electric circuit for controlling the operation of said rotating device, and a switch carried by said tube and adapted to be connected into and to govern said circuit; of swivelling means coupling said tube to said translating means, portions of said coupling means forming with said translating means an annular enclosure; and electric leads connecting said switch into said circuit, said leads passing from said switch longitudinally of said tube into said enclosure, circling within said enclosure, and passing outwardly from said enclosure in fixed relation to said translating means.

7. The combination with a phonograph including a record rotating device, sound translating means movable to engage various surface portions of a record rotated by said device, a sound transmitting tube, an electric circuit for controlling the operation of said rotating device, and a switch carried by said tube and adapted to be connected into and to govern said circuit; of swivelling means coupling said tube to said translating means, portions of said coupling means forming with said translating means an annular enclosure; means for limiting the degree of swivel of said coupling means; and electric leads connecting said switch into said circuit, said leads passing from said switch longitudinally of said tube into said enclosure, circling within said enclosure, and passing outwardly from said enclosure in fixed relation to said translating means.

8. The combination with a phonograph including a record rotating device, sound translating means movable to engage various surface portions of a record rotated by said device, a sound transmitting tube, an electric circuit for controlling the operation of said rotating device, and a switch carried by said tube and adapted to be connected into and to govern said circuit; of means coupling said tube to said translating means and comprising a part in fixed relation to said translating means and a relatively swivellable part; an interior tubular element comprised in said swivellable part and forming with said fixed part an annular recess; and electric leads connecting said switch into said circuit, said leads passing from said switch longitudinally of said tube and into said recess, having a slack portion disposed within said recess, and passing from said recess outwardly through said fixed part of said coupling means.

9. The combination with a phonograph including a record rotating device, sound translating means movable to engage various surface portions of a record rotated by said device, a sound transmitting tube, an electric circuit for controlling the operation of said rotating device, and a switch carried by said tube and adapted to be connected into and to govern said circuit; of means connecting said tube to said translating means and comprising a part in fixed relation to said translating means and a relatively swivellable part; means for limiting the degree of swivel of said swivellable part; interior tubular means comprised in said connecting means providing a sound duct connecting said tube and said translating means and also forming with said fixed part an enclosure about such duct; and electric leads connecting said switch into said circuit, said leads passing from said switch longitudinally of said tube and into said enclosure, therein encircling said duct, and passing from said enclosure outwardly through said fixed part of said coupling means.

10. In a phonograph including a record rotating device, a carriage assembly, a sound box forming part of said assembly, means for moving said assembly to engage at least one element of said sound box with various portions of a record rotated by said device, a sound transmitting tube, an electric circuit for controlling the operation of said rotating device, and a switch carried by said tube and adapted to be connected into and to govern said circuit; the combination of a tubular element extending from and forming a passage for sound to and from said sound box; a ring applied to said carriage assembly in radially spaced relation to said tubular element; a member having an outer portion swivellingly engaging said ring, having a therewith concentric interior tubular portion surrounding said tubular element and forming with said outer portion and said ring an annular recess, and having an exterior tubular portion inclined to said interior tubular portion and connecting the same with said tube; means for limiting the degree of swivel of said member; and electric leads connecting said switch into said circuit, said leads passing from said switch interiorly of said tube and said exterior tubular portion and into said annular recess, therein encircling said interior tubular portion, and passing from said recess outwardly through the wall of said ring.

11. The combination with a phonograph including a record rotating device, sound translating means movable to engage various surface portions of a record rotated by said device, and a sound transmitting tube; of means for coupling said tube to said translating means for sound transfer therebetween, said coupling means comprising a first part adapted to be retained in fixed relation to said translating means and a second part secured to said tube and adapted swivellingly to engage said first part; and means secured to said second part and engaging said translating means to retain said second part swivellingly on said first part, said retaining means coacting with said translating means and said second part to maintain said first part in said fixed relation.

12. The combination with a phonograph including a record rotating device, sound translating means movable to engage various surface portions of a record rotated by said device; and a sound transmitting tube, of means for coupling said tube to said translating means for sound transfer therebetween, said coupling means comprising a first part adapted to be retained in fixed relation to said translating means and a second part secured to said tube and adapted swivellingly to engage said first part; and a single means secured to said second part and engaging said translating means to retain said second part swivellingly on said first part, said single means normally coacting with said translating means and said second part to maintain said first part in said fixed relation and being removable from its engagement with said translating means whereby to detach said tube from said translating means at will.

13. In a phonograph including a record rotating device, a carriage assembly, a sound box forming part of said assembly, means for moving said carriage assembly to engage at least one element of said sound box with various surface portions of a record rotated by said device, and a sound transmitting tube; the combination of a tubular element extending from and forming a passage for sound to and from said sound box, said tubular element being provided with a segmental groove; a ring applied to said carriage assembly in radially spaced relation to said tubular element; a member secured to said tube and adapted swivellingly to engage said ring; and a pin in said member engaging said groove, whereby said member is retained swivellingly engaged with said ring and said ring is retained in operative association with said carriage assembly; relatively inclined tubular portions being included in said member and providing a passage for sound between said tube and said tubular element.

14. The combination with a phonograph including a record rotating device, sound translating means having a sound conducting tubular member and being movable to cooperate with various surface portions of a record rotated by said device, a sound conducting tube, and a control device carried by said tube and actuatable to control a part of the phonograph; of means connecting said tube to said sound translating means for relative swivelling movement and having a tubular portion cooperating with said tubular member to provide a sound duct therebetween; and flexible means connected to and extending from said control device, said flexible means having spaced portions adjacent said duct which are respectively associated with said tube and translating means to partake of substantially all movements thereof respectively and having a slack portion connecting said spaced portions and loosely encircling said duct.

15. The combination with a phonograph including a record rotating device, sound translating means having a sound conducting tubular member and being movable to cooperate with various surface portions of a record rotated by said device, a sound conducting tube, and a control device carried by said tube and actuatable to control a part of the phonograph; of means connecting said tube to said translating means for relative swivelling movement and having a tubular portion cooperating with said tubular member to provide a sound duct therebetween, said connecting means also providing an enclosure without but adjacent said duct; and flexible means connected to and extending from said control device, said flexible means having spaced portions adjacent said enclosure which are respectively associated with said tube and translating means to partake of substantially all movement thereof respectively and having a slack portion connecting said spaced portions and disposed within said enclosure.

SAM G. LANGLEY.

CERTIFICATE OF CORRECTION.

Patent No. 2,102,423.               December 14, 1937.

SAM G. LANGLEY.

It is hereby certified that error appears in the printed specification of the above numbered patent requiring correction as follows: Page 2, second column, line 21, for "couping" read coupling; line 52, for "arranaged" read arranged; page 3, first column, line 51-52, for "elemeans" read elements; and second column, line 8, after "apparatus" strike out the period and insert instead a comma; page 4, second column, line 14, claim 10, after "circuit" strike out the semicolon and insert instead a colon; page 5, second column, line 26-27, claim 15, for "movement" read movements; and that the said Letters Patent should be read with these corrections therein that the same may conform to the record of the case in the Patent Office.

Signed and sealed this 22nd day of February, A. D. 1938.

(Seal)

Henry Van Arsdale,
Acting Commissioner of Patents.